(12) United States Patent
Martin et al.

(10) Patent No.: US 8,046,369 B2
(45) Date of Patent: Oct. 25, 2011

(54) MEDIA ASSET RATING SYSTEM

(75) Inventors: Timothy Martin, Sunnyvale, CA (US);
Jeffrey L. Robbin, Los Altos, CA (US);
David Heller, Los Altos, CA (US);
Anne Jones, Emerald Hills, CA (US)

(73) Assignee: Apple Inc., Cupertino, CA (US)

( * ) Notice: Subject to any disclaimer, the term of this patent is extended or adjusted under 35 U.S.C. 154(b) by 256 days.

(21) Appl. No.: 11/849,995

(22) Filed: Sep. 4, 2007

(65) Prior Publication Data

US 2009/0063543 A1     Mar. 5, 2009

(51) Int. Cl.
*G06F 700/2006*     (2006.01)
(52) U.S. Cl. ..................... 707/748
(58) Field of Classification Search .......... None
See application file for complete search history.

(56) References Cited

U.S. PATENT DOCUMENTS

| | | | |
|---|---|---|---|
| 3,990,710 A | 11/1976 | Hughes |
| 4,528,643 A | 7/1985 | Freeny, Jr. |
| 4,851,931 A | 7/1989 | Parker et al. |
| 5,168,481 A | 12/1992 | Culbertson et al. |
| 5,181,107 A | 1/1993 | Rhoades |
| 5,191,573 A | 3/1993 | Hair |
| 5,341,350 A | 8/1994 | Frank et al. |
| 5,355,302 A | 10/1994 | Martin et al. |
| 5,418,713 A | 5/1995 | Allen |
| 5,428,735 A | 6/1995 | Kahl et al. |
| 5,459,824 A | 10/1995 | Kashiwazaki |
| 5,481,509 A | 1/1996 | Knowles |
| 5,504,852 A | 4/1996 | Thompson-Rohrlich |
| 5,559,945 A | 9/1996 | Beaudet et al. |
| 5,561,604 A | 10/1996 | Buckley et al. |
| 5,566,353 A | 10/1996 | Cho et al. |
| 5,583,993 A | 12/1996 | Foster et al. |
| 5,587,404 A | 12/1996 | Kroner et al. |
| 5,616,876 A | 4/1997 | Cluts |
| 5,633,839 A | 5/1997 | Alexander et al. |
| 5,640,566 A | 6/1997 | Victor et al. |
| 5,666,530 A | 9/1997 | Clark et al. |
| 5,710,922 A | 1/1998 | Alley et al. |
| 5,714,971 A | 2/1998 | Shalit et al. |
| 5,721,949 A | 2/1998 | Smith et al. |
| 5,726,909 A | 3/1998 | Krikorian |
| 5,727,202 A | 3/1998 | Kucala |
| 5,734,823 A | 3/1998 | Saigh et al. |
| 5,739,451 A | 4/1998 | Winksy et al. |

(Continued)

FOREIGN PATENT DOCUMENTS

EP     0 917 077     5/1999

(Continued)

OTHER PUBLICATIONS

"Apple Announces iTunes 2," Press Release, Apple Computer, Inc., Oct. 23, 2001.

(Continued)

*Primary Examiner* — Charles Rones
*Assistant Examiner* — Dinku Gebresenbet

(57) ABSTRACT

Improved techniques for assigning ratings to media assets are disclosed. A rating for a media asset collection can, for example, be determined by examining the ratings of all user-rated media assets in that media asset collection. Additionally or alternately, a rating for media assets in a group of media assets can, for example, be determined by examining the rating of the group of media assets.

13 Claims, 4 Drawing Sheets

U.S. PATENT DOCUMENTS

| | | | |
|---|---|---|---|
| 5,740,134 A | 4/1998 | Peterson |
| 5,819,160 A | 10/1998 | Foladare et al. |
| 5,835,721 A | 11/1998 | Donahue et al. |
| 5,835,732 A | 11/1998 | Kikinis et al. |
| 5,845,282 A | 12/1998 | Alley et al. |
| 5,864,868 A | 1/1999 | Contois |
| 5,875,110 A | 2/1999 | Jacobs |
| 5,897,642 A | 4/1999 | Capossela et al. |
| 5,918,213 A | 6/1999 | Bernard et al. |
| 5,918,303 A | 6/1999 | Yamaura et al. |
| 5,923,757 A | 7/1999 | Hocker et al. |
| 5,925,843 A | 7/1999 | Miller et al. |
| 5,926,819 A | 7/1999 | Doo et al. |
| 5,963,916 A | 10/1999 | Kaplan |
| 5,969,283 A | 10/1999 | Looney et al. |
| 5,983,069 A | 11/1999 | Cho et al. |
| 5,995,098 A | 11/1999 | Okada et al. |
| 6,000,000 A | 12/1999 | Hawkins et al. |
| 6,006,274 A | 12/1999 | Hawkins et al. |
| 6,038,199 A | 3/2000 | Pawlowski et al. |
| 6,041,023 A | 3/2000 | Lakhansingh |
| 6,052,797 A | 4/2000 | Ofek et al. |
| 6,061,306 A | 5/2000 | Buchheim |
| 6,125,369 A | 9/2000 | Wu et al. |
| 6,172,948 B1 | 1/2001 | Keller et al. |
| 6,208,044 B1 | 3/2001 | Viswanadham et al. |
| 6,216,131 B1 | 4/2001 | Liu et al. |
| 6,243,328 B1 | 6/2001 | Fenner et al. |
| 6,243,725 B1 | 6/2001 | Hempleman et al. |
| 6,247,135 B1 | 6/2001 | Feague |
| 6,248,946 B1 | 6/2001 | Dwek |
| 6,255,961 B1 | 7/2001 | Van Rzin et al. |
| 6,272,545 B1 | 8/2001 | Flanagin et al. |
| 6,283,764 B2 | 9/2001 | Kajiyama et al. |
| 6,295,541 B1 | 9/2001 | Bodnar et al. |
| 6,332,175 B1 | 12/2001 | Birrell et al. |
| 6,341,316 B1 | 1/2002 | Kloba et al. |
| 6,356,971 B1 | 3/2002 | Katz et al. |
| 6,380,947 B1 | 4/2002 | Stead |
| 6,389,467 B1 | 5/2002 | Eyal |
| 6,407,750 B1 | 6/2002 | Gioscia et al. |
| 6,434,680 B2 | 8/2002 | Belknap et al. |
| 6,446,080 B1 | 9/2002 | Van Ryzin et al. |
| 6,452,609 B1 | 9/2002 | Katinsky et al. |
| 6,453,281 B1 | 9/2002 | Walters et al. |
| 6,490,432 B1 | 12/2002 | Wegener et al. |
| 6,493,758 B1 | 12/2002 | McLain |
| 6,523,124 B1 | 2/2003 | Lunsford et al. |
| 6,529,804 B1 | 3/2003 | Draggon et al. |
| 6,563,769 B1 | 5/2003 | Van Der Meulen |
| 6,587,403 B1 | 7/2003 | Keller et al. |
| 6,587,404 B1 | 7/2003 | Keller et al. |
| 6,621,768 B1 | 9/2003 | Keller et al. |
| 6,636,873 B1 | 10/2003 | Carini et al. |
| 6,664,981 B2 | 12/2003 | Ashe et al. |
| 6,665,803 B2 | 12/2003 | Lunsford et al. |
| 6,718,348 B1 | 4/2004 | Novak et al. |
| 6,721,489 B1 | 4/2004 | Benyamin et al. |
| 6,731,312 B2 | 5/2004 | Robbin |
| 6,760,721 B1 | 7/2004 | Chasen et al. |
| 6,763,345 B1 | 7/2004 | Hempleman et al. |
| 6,779,019 B1 | 8/2004 | Mousseau et al. |
| 6,785,542 B1 | 8/2004 | Blight et al. |
| 6,794,566 B2 | 9/2004 | Pachet |
| 6,801,964 B1 | 10/2004 | Mahdavi |
| 6,874,037 B1 | 3/2005 | Abram et al. |
| 6,928,433 B2 | 8/2005 | Goodman et al. |
| 6,933,433 B1 | 8/2005 | Porteus et al. |
| 6,941,324 B2 | 9/2005 | Plastina et al. |
| 6,978,127 B1 | 12/2005 | Bulthuis et al. |
| 6,987,221 B2 | 1/2006 | Platt |
| 7,003,495 B1 | 2/2006 | Burger et al. |
| 7,043,477 B2 | 5/2006 | Mercer et al. |
| 7,055,165 B2 | 5/2006 | Connelly |
| 7,111,009 B1 | 9/2006 | Gupta et al. |
| 7,117,516 B2 | 10/2006 | Khoo et al. |
| 7,126,770 B1 | 10/2006 | Arai et al. |
| 7,171,557 B2 | 1/2007 | Kallahalla et al. |
| 7,209,633 B1 | 4/2007 | Novak et al. |
| 7,228,298 B1 | 6/2007 | Raines |
| 7,272,385 B2 | 9/2007 | Mirouze et al. |
| 7,478,323 B2 | 1/2009 | Dowdy |
| 7,502,626 B1 | 3/2009 | Lemilainen |
| 7,797,446 B2 | 9/2010 | Heller et al. |
| 2001/0004310 A1 | 6/2001 | Kono |
| 2001/0011308 A1 | 8/2001 | Clark et al. |
| 2001/0021053 A1 | 9/2001 | Colbourne et al. |
| 2001/0041021 A1 | 11/2001 | Boyle et al. |
| 2001/0044835 A1 | 11/2001 | Schober et al. |
| 2001/0048642 A1 | 12/2001 | Berhan |
| 2001/0052123 A1 | 12/2001 | Kawai |
| 2002/0002413 A1 | 1/2002 | Tokue |
| 2002/0010788 A1 | 1/2002 | Nathan et al. |
| 2002/0013784 A1 | 1/2002 | Swanson |
| 2002/0015161 A1 | 2/2002 | Haneda et al. |
| 2002/0016968 A1 | 2/2002 | Nathan et al. |
| 2002/0027561 A1 | 3/2002 | Wu |
| 2002/0046315 A1 | 4/2002 | Miller et al. |
| 2002/0054079 A1 | 5/2002 | Russel |
| 2002/0055934 A1 | 5/2002 | Lipscomb et al. |
| 2002/0073167 A1 | 6/2002 | Powell et al. |
| 2002/0080180 A1 | 6/2002 | Mander et al. |
| 2002/0116082 A1 | 8/2002 | Gudorf |
| 2002/0118300 A1 | 8/2002 | Middleton et al. |
| 2002/0133515 A1 | 9/2002 | Kagle et al. |
| 2002/0138606 A1 | 9/2002 | Robison |
| 2002/0152278 A1 | 10/2002 | Pontenzone et al. |
| 2002/0161865 A1 | 10/2002 | Nguyen |
| 2002/0174269 A1 | 11/2002 | Spurgat et al. |
| 2002/0193895 A1 | 12/2002 | Qian et al. |
| 2002/0194195 A1* | 12/2002 | Fenton et al. ............... 707/104.1 |
| 2002/0194309 A1 | 12/2002 | Carter et al. |
| 2003/0013493 A1 | 1/2003 | Irimajiri et al. |
| 2003/0014767 A1 | 1/2003 | Stumphauzer |
| 2003/0030733 A1 | 2/2003 | Seaman et al. |
| 2003/0037254 A1 | 2/2003 | Fischer et al. |
| 2003/0046434 A1 | 3/2003 | Flanagin et al. |
| 2003/0050058 A1 | 3/2003 | Walsh et al. |
| 2003/0055723 A1 | 3/2003 | English |
| 2003/0074457 A1 | 4/2003 | Kluth |
| 2003/0079038 A1 | 4/2003 | Robbin et al. |
| 2003/0081784 A1 | 5/2003 | Kallahalla et al. |
| 2003/0093340 A1 | 5/2003 | Krystek et al. |
| 2003/0098893 A1 | 5/2003 | Makinen |
| 2003/0107585 A1 | 6/2003 | Samuelson |
| 2003/0112279 A1 | 6/2003 | Irimajiri |
| 2003/0149628 A1 | 8/2003 | Abbosh et al. |
| 2003/0167318 A1 | 9/2003 | Robbin et al. |
| 2003/0174882 A1 | 9/2003 | Turpin et al. |
| 2003/0182315 A1 | 9/2003 | Plastina et al. |
| 2003/0191756 A1 | 10/2003 | Oh |
| 2003/0206203 A1 | 11/2003 | Ly |
| 2003/0210821 A1 | 11/2003 | Yogeshwar et al. |
| 2003/0221541 A1 | 12/2003 | Platt |
| 2004/0001395 A1 | 1/2004 | Keller et al. |
| 2004/0001396 A1 | 1/2004 | Keller et al. |
| 2004/0017997 A1 | 1/2004 | Cowgill |
| 2004/0027930 A1 | 2/2004 | Kudo |
| 2004/0054542 A1 | 3/2004 | Foote et al. |
| 2004/0055446 A1 | 3/2004 | Robbin et al. |
| 2004/0071922 A1 | 4/2004 | McCarthy et al. |
| 2004/0076086 A1 | 4/2004 | Keller |
| 2004/0083480 A1 | 4/2004 | Dodge |
| 2004/0093274 A1 | 5/2004 | Vanska et al. |
| 2004/0103102 A1 | 5/2004 | Nelson |
| 2004/0113915 A1 | 6/2004 | Ohtsuki et al. |
| 2004/0123242 A1 | 6/2004 | McKibben |
| 2004/0123725 A1 | 7/2004 | Kim |
| 2004/0128277 A1 | 7/2004 | Mander et al. |
| 2004/0139180 A1 | 7/2004 | White et al. |
| 2004/0148358 A1 | 7/2004 | Singh et al. |
| 2004/0164991 A1 | 8/2004 | Rose |
| 2004/0205028 A1 | 10/2004 | Verosub et al. |
| 2004/0223245 A1 | 11/2004 | Morohashi |
| 2004/0225762 A1 | 11/2004 | Poo |
| 2004/0261064 A1 | 12/2004 | Goldstein et al. |
| 2005/0031197 A1 | 2/2005 | Knopp |

| | | | |
|---|---|---|---|
| 2005/0055718 | A1 | 3/2005 | Stone |
| 2005/0060264 | A1 | 3/2005 | Schrock et al. |
| 2005/0080915 | A1 | 4/2005 | Shoemaker |
| 2005/0141771 | A1 | 6/2005 | Yamakado et al. |
| 2005/0149392 | A1 | 7/2005 | Gold et al. |
| 2005/0235015 | A1 | 10/2005 | Abanami et al. |
| 2005/0240494 | A1 | 10/2005 | Cue et al. |
| 2005/0240661 | A1 | 10/2005 | Heller et al. |
| 2005/0249080 | A1 | 11/2005 | Foote et al. |
| 2005/0262528 | A1 | 11/2005 | Herley |
| 2005/0267803 | A1 | 12/2005 | Patel et al. |
| 2005/0278377 | A1 | 12/2005 | Mirrashidi et al. |
| 2006/0015378 | A1* | 1/2006 | Mirrashidi et al. ............... 705/7 |
| 2006/0036567 | A1 | 2/2006 | Tan |
| 2006/0066627 | A1 | 3/2006 | Gerhard et al. |
| 2006/0089949 | A1 | 4/2006 | Robbin |
| 2006/0100978 | A1 | 5/2006 | Heller et al. |
| 2006/0156236 | A1 | 7/2006 | Heller et al. |
| 2006/0156239 | A1 | 7/2006 | Jobs |
| 2006/0163358 | A1 | 7/2006 | Biderman |
| 2006/0168340 | A1 | 7/2006 | Heller et al. |
| 2006/0247980 | A1* | 11/2006 | Mirrashidi et al. ............. 705/26 |
| 2008/0256378 | A1 | 10/2008 | Guillorit |
| 2009/0063496 | A1* | 3/2009 | Cunningham et al. .......... 707/10 |

FOREIGN PATENT DOCUMENTS

| | | |
|---|---|---|
| EP | 0 982 732 | 3/2000 |
| EP | 1 028 425 | 8/2000 |
| EP | 1 548 740 | 6/2005 |
| JP | 2000-339917 | 12/2000 |
| JP | 2001-76465 | 3/2001 |
| JP | 2001-93226 | 4/2001 |
| JP | 2001-117800 | 4/2001 |
| JP | 2001/291365 A | 10/2001 |
| JP | 2002/74909 A | 3/2002 |
| WO | WO 95/16950 | 6/1995 |
| WO | WO 01/33569 | 5/2001 |
| WO | WO 01/67753 | 9/2001 |
| WO | WO 02/25610 | 3/2002 |
| WO | WO 02/25935 | 3/2002 |
| WO | WO 03/023786 | 3/2003 |
| WO | WO 2004-004338 | 1/2004 |
| WO | WO 2004/084413 | 9/2004 |
| WO | 2005073856 A2 | 8/2005 |

OTHER PUBLICATIONS

"Apple Introduces iTunes—World's Best and Easiest To Use Jukebox Software," Macworld Expo, San Francisco, Jan. 9, 2001.
"Apple's iPod Available in Stores Tomorrow," Press Release, Apple Computer, Inc., Nov. 9, 2001.
"Hewlett Packard Jornada 525 Color Pocket PC," downloaded Jan. 25, 2002, http://www.pc4d.com/electronics/products/56/jornada_525_color_pocket_pc.shtml.
"Nomad Jukebox," User Guide, Creative Technology Ltd., Version 1, Aug. 2000.
"Replay Gain—A proposed Standard," Oct. 7, 2001, from http://replaygain.hydrogenaudio.org/index.html and http://replaygain.hydrogenaudio.org/outline.html.
"SoundJam MP Plus Manual, version 2.0"—MP3 Player and Encoder for Macintosh by Jeffrey Robbin, Bill Kincaid and Dave Heller, manual by Tom Negrino, published by Casady & Greene, Inc., 2000.
"About MusicMatch Jukebox," MusicMatch Jukebox v4 Help, 1999, pp. 1-4.
"iTunes Celebrates Its First Anniversary; Over 70 Million Songs Purchased," Apr. 28, 2004, http://www.apple.com/pr/library/2004/apr/28itunes.html.
"Rio Portable Music Player," Independent Web Review, downloaded Jan. 25, 2002, http://www.webreviews.com/9901/rio.html.
Birrell, Andrew, "Personal Jukebox (PJB)," Oct. 13, 2000, http://birrell.org/andrew/talks/pjb-overview.ppt.
Breen, Christopher, "iMixing it Up: Sharing Your Sounds," Sep. 17, 2004, http://playlistmag.com/help/2004/09/imixhowto/index.php.
Bridgman, "Windows XP Expert Zone Community Columnist", Using Windows Mobil-based Portable Media Centers and Windows Media Player 10, Aug. 25, 2004, 1-11.
Butler, Travis, "Archos Jukebox 6000 Challenges Nomad Jukebox," Aug. 13, 2001, http://db.tidbits.com/getbits.acgi?tbart=06521.
Butler, Travis, "Portable MP3: The Nomad Jukebox," Jan. 8, 2001, http://db.tidbits.com/getbits.acgi?tbart=06261.
Compaq Computer Corp., copyright 1991, Personal Jukebox User Manual, pp. 1-29.
Compaq, "Personal Jukebox," Jan. 24, 2001, http://research.compaq.com/SRC/pjb/.
De Herrera, Chris, "Microsoft ActiveSync 3.1," Version 1.02, Oct. 13, 2000.
Engst, Adam C., "SoundJam Keeps on Jammin'," Jun. 19, 2000, http://db.tidbits.com/getbits.acgi?tbart=05988.
Fleishman, Glenn, "Handheld iPod joins MP3 band a bit late, but is standout player," Nov. 6, 2001, http://seattletimes.nwsource.com/html/businesstechnology/134361811_ptmacc040.html.
Handbook for Palm™ m500 Series Handhelds, User Manual, copyright 1998-2001.
IEEE 1394—Wikipedia, 1995, http://www.wikipedia.org/wiki/Firewire.
iTunes 2, Playlist Related Help Screens, iTunes v2.0, Apple Computer, Inc., Oct. 23, 2001.
iTunes, Digital Music for your Mac, Apple Computer, Inc., downloaded Oct. 22, 2001, http://www.apple.com/itunes/.
iTunes, Playlist Related Help Screens, iTunes v1.0, Apple Computer, Inc., Jan. 2001.
Kawamoto et al., "On $1^{st}$ Birthday, iTunes Unwraps New Features," Apr. 28, 2004, http://news.com.com/On+1st+birthday,+iTunes+unwraps+new+features/2100-1027_3-5201598.html.
Lindauer, Andy, "What's in your Pocket?," Edgereview, downloaded Jan. 25, 2002, http://www.edgereview.com/print.cfm?Type=aag&ID=286.
Lyra, Personal Digital Player, RCA, Product Box, (2003).
Miniman, "Applian Software's Replay Radio and Player v1.02," Product review, pocketnow.com, http://www.pocketnow.com/reviews/replay/replay.htm, Jul. 31, 2001.
Musicmatch, "Musicmatch and Xing Technology Introduce Musicmatch Jukebox," May 18, 1998, http://www.musicmatch.com/info/company/press/releases/?year=1998&release=2.
RCA Lyra User's Guide, RD2201/2202/2204, www.lyrazone.com, (1999) pp. 1-37.
RealJukebox Plus Manual, Real Networks, Inc., copyright 1999, pp. 1-83.
RealJukebox, Real Networks, Inc., webpages downloaded Oct. 27, 2005 http://www.real.com/Jukebox/release_notes.html#.
Sinitsyn, "A Synchronization Framework for Personal Mobile Servers," Proceedings of the Second IEEE Annual Conference on Pervasive Computing and Communications Workshops, Piscataway, NJ, Mar. 14, 2004, pp. 1-4.
SoundJam MP Plus, Representative Screens, published by Casady & Greene, Inc., Salinas, CA, 2000.
Specification Sheet, iTunes 2, Apple Computer, Inc., Oct. 31, 2001.
Steinberg, "Sonicblue Rio Car," Product Review, Dec. 12, 2000, http://electronics.cnet.com/electronics/0-6342420-1304-4098389.html.
TuneBase 100 User Guide, A CD Library Management System, Escient, Inc. copyright 1999.
TuneBase Pro Mk-II User's Guide, Escient, Inc. (1999).
Vetro et al., "Media Conversions to Support Mobile Users," IEEE Canadian Conference on Electrical and Computer Engineering, Piscataway, NJ, May 13, 2001, pp. 607-612.
Window's Media Player 6.4, Microsoft Corp., copyright 1999, software available at http://www.oldversion.com/program.php?n=wmp See also Windows Media Player 6.4 Software Official website at http://www.microsoft.com/windows/windowsmedia/player/version64/default.aspx.
Zheng et al., "MobiGATE: a mobile gateway proxy for the active deployment of transport entities," Proceedings of the 2004 International Conference on Parallel Processing, Piscataway, NJ, Aug. 15, 2004.
PBS Local Insertion Server Instruction Manual, Microvision, Inc., pp. 1-71, Jun. 19, 1996.

Wave Station Digital Audio Automation System, Instruction & Operations Manual Broadcast Software International, pp. 1-113, Feb. 4, 1997.

Nielsen et al., "Comparative Design Review: An Exercise in Parallel Design", Interchi '93, pp. 414-417Apr. 24-29, 1993.

Lowery Daryl, "Random-Access Digital Audio—Recording Systems", pp. 68-71, Jun. 1992.

Sadie Master System, Product Brochure, Studio audio Digital Equipment Inc., 2 pgs., Jan. 1995.

RCS Works-Cart Wall User's Guide and Reference Manual, pp. 1-83, Feb. 7, 1993.

"Digital Audio Just Got Easier!", CartWorks Digital Audio Systems, dbm Systems, Inc., Jun. 26, 1996.

"CartWorks File Utilities User's Manual", dbm Systems, Inc., pp. 1-8., Jul. 1998.

"CartWorks MHD Music-on-Hard-Drive QuickSchedule User's Manual", dbm Systems, Inc., pp. 1-8, Feb. 8, 1998.

"CartWorks MHD Music-on-Hard-Drive User's Manual V6.8", dbm Systems, Inc., pp. 1-11, Feb. 1998.

"CartWorks On-Demand Editor User's Manual", dbm Systems, Inc., pp. 1-7., Feb. 1998.

"CartWorks Script Editor User's Manual v3.12", dbm Systems, Inc., pp. 1-26., Feb. 1998.

"CartWorks Spot Set Editor User's Manual", dbm Systems, Inc., pp. 1-11., Feb. 1998.

"The DADpro Digital Audio Delivery System Operation Manual Version 1.0", IBM Corp., pp. 1-424, Aug. 30, 1996.

"Virtual Recorder—Basic Operations", ASC Audio Video Corporation, pp. 1-94, Sep. 9, 1996.

"Broadcast Tools: SpotBase, Playlist & TapeBase", ASC Audio Video Corporation, pp. 1-2., Mar. 1998.

"VR 300 Advanced Broadcast Video Server", ASC Audio Video Corporation, pp. 1-9., Mar. 1998.

"VR300 Video Server User Manual, Version 1.0", ASC Audio Video Corporation, pp. 1-40, Mar. 20, 1998.

"Gravis WinDecks Version 1.12", screen shots, Gravis Computer Technology Ltd., pp. 1-10., Jan. 1990.

WinDecks, User Instructions, Gravis Computer Technology Ltd., pp. 1-14., Jan. 1990.

Iriver, "PMP140/120", Sep. 13, 2004, 1-2 pgs.

MG-25, Portable MPEG4 Player (MG-25), Jul. 29, 2004, 1-3 pgs.

Windows XP Service Pack 2, Figures 1-2 and "How to obtain the latest Windows XP service pack," Aug. 25, 2004.

"Color Terminology," Carnright Design, 2004, downloaded from www.carnrightdesign.com/color4business/speaking_color.htm on Jan. 13, 2005.

"Color Wheel," downloaded from http://hort.ifas.ufl.edu/TEACH/floral/color.htm on Jan. 13, 2005.

"Complimentary Chromatic Colors," downloaded from www.smartpixel.net/chromoweb/uks/indexgb.html on Nov. 22, 2004.

"Color and Vision Questions and Answers," Color Vision FAQ, downloaded from www.cis.rit.edu/mcsl/faq/faq1.shtml on Nov. 22, 2004.

Miser et al., iPod + iTunes Starter Kit, Publisher, Que, Pub Date: Dec. 1, 2004, pp. 1-12.

Chopde, Avinash, CD/DVD Inserts and Envelopes, Nov. 2003, cdlablegens, version, 3.0.0, pp. 1-5.

Obrador, Pere, Automatic Color Scheme Picker for Document Templates based on Image Analysis and Dueal Problem, Jan. 19, 2006, Hewlett-Packard Laboratories, pp. 1-10.

Mabini. MemMaid Review. Pocket PC Dubai, Jul. 23, 2004[online], [retrieved on Mar. 26, 2008]. Retrieved from the Internew <URL: http://www.pocketpcdubai.com/DinarSoft/memmaid_review.html>.

Torrone, Phillip, How-To: Getting Podcasts on a Portable Media Center (and other Windows Media Devices, Oct. 2004.

Personal Jukebox (PJB), "System Research Center and PAAD", Compaq Computer Corp., Oct. 13, 2000, http;//research.compaq.com/SRC/pjb/.

Etchison, "Accelerated Discrete Adjustment of the Parameters of a Process", IBM Technical Disclosure Bulletin, vol. 15, No. 5, Oct. 1, 1972, 2 pgs.

Chakarova et al., "Digital Still Cameras—Downloading Images to a Computer," Multi-Media Reporting and Convergence, 2 pgs, Jan. 8, 2006.

Moretti, et al., "Tools for the Selection of Colour Palettes," Institute of Information Sciences and Technology Massey University, New Zealand, Jul. 11-12, 2002.

Half-life—Wikipedia, the free encyclopedia, http;//enwikipedia.org/wiki/Halfe-life, Feb. 22, 2009.

* cited by examiner

MEDIA ASSET RATING SYSTEM

BACKGROUND OF THE INVENTION

1. Field of the Invention

The present invention relates to media asset groups and, more particularly, to rating media asset groups or media assets therein.

2. Description of the Related Art

Currently, many media management applications, such as the iTunes™ application, produced by Apple Inc. of Cupertino, Calif., offer ways to rate media assets. For example, iTunes™ allows media assets to be rated on a scale of 1 to 5, with 5 being the highest rating.

Media assets can include any and all kinds of digital media formats, such as audio files (e.g., MP3, AAC, Ogg Vorbis, etc.) or video files (e.g., QuickTime®, AVI). Media assets collections can include any collection of media assets, such as music albums, and music compilations. Another example of a media asset collection is known as a playlist, which can pertain to a group of audio tracks.

However, current methods of rating media assets depend on intensive user input. Typically, a user must rate each individual media asset in his or her collection separately, which can be time-consuming, especially for large groups of media assets. Thus, there is a need for improved approaches to rate media assets.

SUMMARY OF THE INVENTION

The invention pertains to improved techniques for rating media assets or media asset groups (i.e., collection of media assets). In one embodiment, ratings of media assets within a media asset group can be used to automatically determine a rating applied to the media asset group. For example, one or more ratings assigned to one or more songs on an album can be used to determine a rating for the entire album. In another embodiment, a rating of a media asset group can be used to automatically determine a rating for one or more of the media assets in the media asset group.

The invention can be implemented in numerous ways, including as a method, system, device, or apparatus (including computer readable medium or graphical user interface). Several embodiments of the invention are discussed below.

As a computer-implemented method for assigning ratings to media assets, one embodiment of the invention includes at least the act of determining a rating for an unrated media asset collection based on the user-ratings of one or more user-rated media assets in the media asset collection.

As a media management system, one embodiment of the invention includes at least a rating module. The rating module can, for example, be configured to (i) determine a rating for a user-unrated media asset collection based on prior user ratings of one or more of the media assets in the media asset collection; and (ii) determine a rating for one or more user-unrated media assets in a user-rated media asset collection based on the user-rating of the user-rated media asset collection.

As a computer-implemented method for assigning ratings to media assets, one embodiment of the invention includes at least: receiving a user collection rating for a collection including a plurality of tracks; and assigning the user collection rating to those of the tracks within the collection that have not been previously user-rated.

As a computer readable medium including at least executable computer program code tangibly stored thereon for assigning ratings to media assets, one embodiment of the invention includes at least: computer program code for receiving a user collection rating for a collection including a plurality of tracks; computer program code for assigning the user collection rating to those of the tracks within the collection that have not been previously user-rated; computer program code for receiving a user track rating associated with a particular one of the tracks; computer program code for assigning the user track rating to the particular one of the tracks; computer program code for determining whether the collection has been previously user-rated; computer program code for determining a computed track rating based on the tracks of the collection that have been previously rated by the user; and computer program code for assigning the computed track rating to the collection as a calculated collection rating if the collection is determined not to have been previously user-rated.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to improved techniques for rating media assets or media asset groups (i.e., collection of media assets). In one embodiment, ratings of media assets within a media asset group can be used to automatically determine a rating applied to the media asset group. For example, one or more ratings assigned to one or more songs on an album can be used to determine a rating for the entire album. In another embodiment, a rating of a media asset group can be used to automatically determine a rating for one or more of the media assets in the media asset group.

Embodiments of the invention are discussed below with reference to FIGS. 1-4. However, those skilled in the art will readily appreciate that the detailed description given herein with respect to these figures is for explanatory purposes as the invention extends beyond these limited embodiments.

Figure 1:
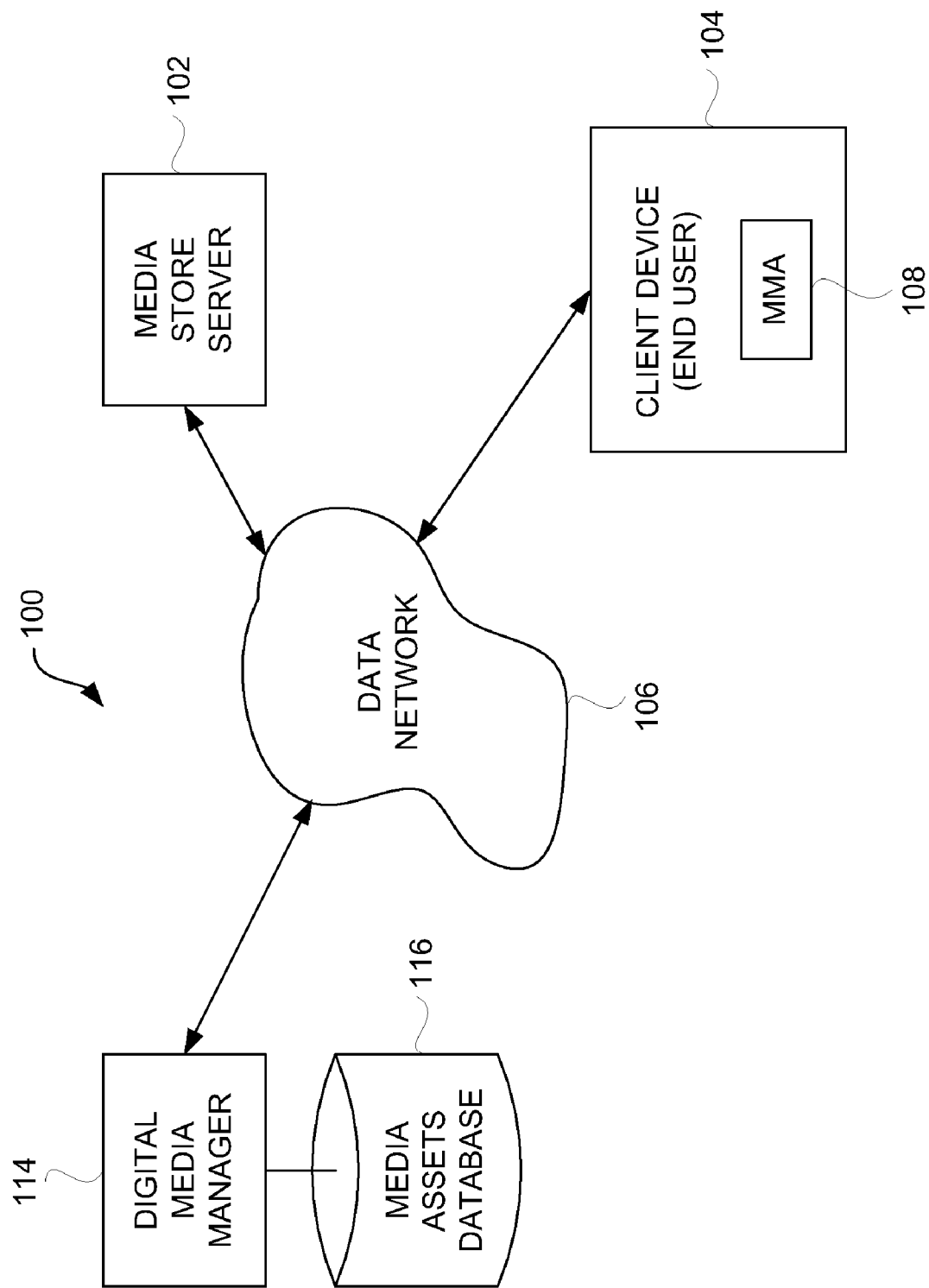
FIG. 1 is a block diagram of a media purchase system according to one embodiment of the invention.

FIG. 1 is a block diagram of a media purchase system 100 according to one embodiment of the invention. The media purchase system 100 includes a media store server 102 that hosts an on-line media store. The media store server 102 can off-load commerce transactions and/or delivery of purchased digital media assets to other servers, if desired. As shown in FIG. 1, the media purchase system 100 includes one or more client devices 104 for use by end users. The client devices 104 couple to a data network 106. Additionally, the media store server 102 also couples to the data network 106. In one implementation, the data network 106 can refer to one or more data networks, typically, high data-bandwidth networks, namely, wired networks, such as the Internet, Ethernet, gigabit Ethernet, and fiber optic, as well as wireless networks such as IEEE 802.11(a), (b) or (g) (WiFi), IEEE 802.16 (WiMax), and Ultra-Wide Band (UWB).

A computer program 108, typically a media management application (MMA) or other media player application runs on the client device 104. One example of a media management application is the iTunes™ application, produced by Apple Inc. of Cupertino, Calif. The client devices 104 are, in general, computing devices. As an example, the client devices 104 can be specific or general-purpose personal computers or portable media players. One example of a portable media player suitable for use with the invention is the iPod™, also produced by Apple Inc. The computer program 108 can be used by a consumer for a variety of purposes, including, but not limited to, browsing and/or purchasing media assets from the on-line media store provided by the media store server 102, creating and sharing media asset groups (e.g., playlists), organizing media assets, presenting/playing media assets, and transferring media assets between client devices 104.

The media purchase system 100 also includes a digital asset manager 114. The digital asset manager 114 is coupled to a media assets database 116. The media assets database 116 stores media asset information including metadata relating to digital media assets available for purchase at the on-line media store. The metadata can pertain to individual media assets (digital media assets) or media asset groups (digital media asset groups). Media assets can include, but are not limited to, music, video, text, and/or graphics files. In the case of music, a media asset group can be a playlist for the music.

The media store server 102 enables the user of a particular client device 104 to purchase media assets (e.g., songs, videos, albums). Subsequently, the client device 104 can download the purchased media assets from the media store server 102, or some other server, via the data network 106. As will be understood by those familiar with data networks, other network configurations are possible. Furthermore, while the media store server 102 and the digital asset manager 114 are shown as individual and separate devices, it will be understood by those familiar with the art that other configurations are possible. As one example, each device can be implemented such that it is distributed over multiple server computers. As another example, these various servers and/or managers can be implemented by a single physical server computer.

Figure 2:
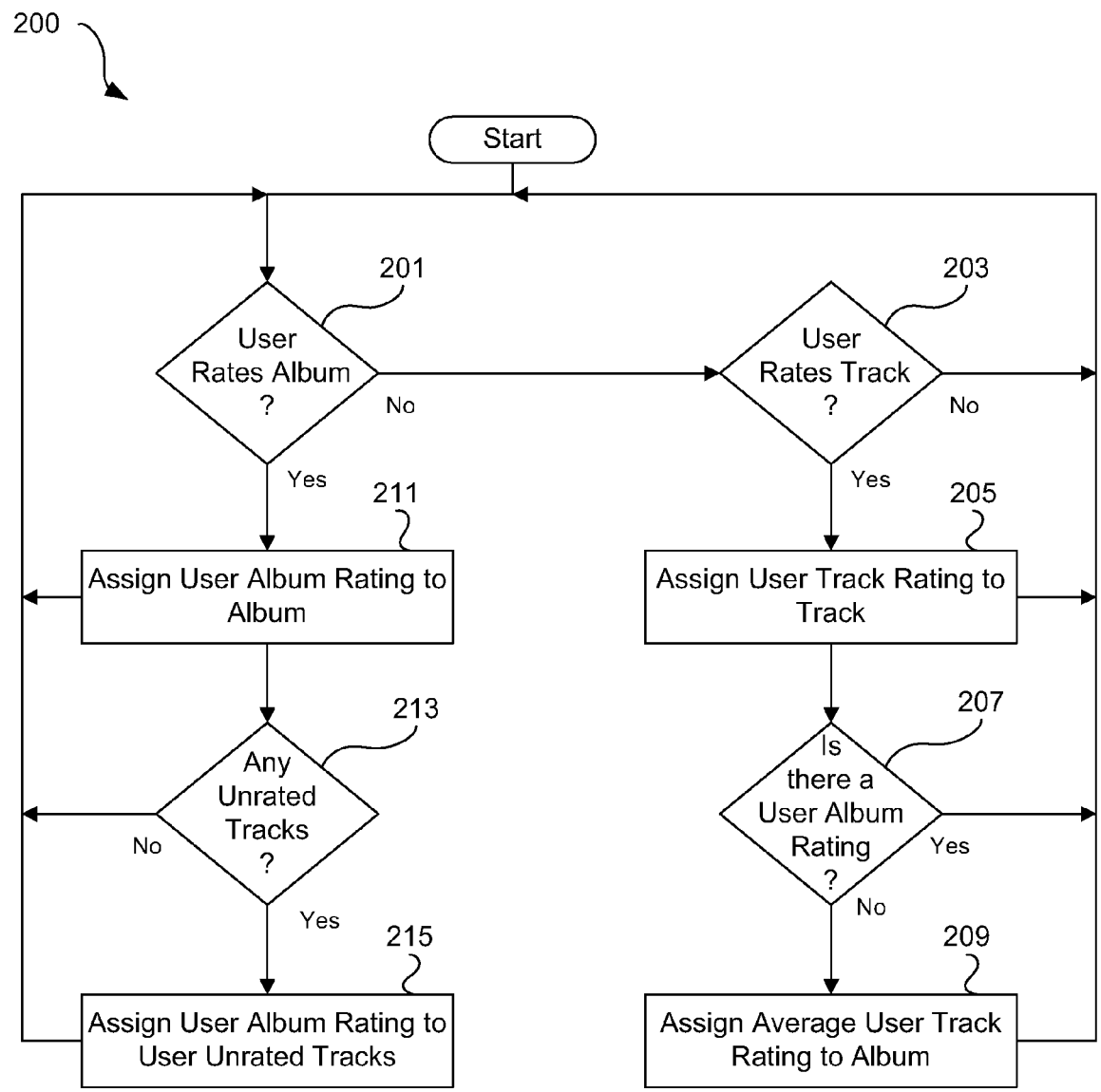
FIG. 2 is flow diagram of a media asset rating calculation process according to one embodiment of the invention

FIG. 2 is a flow diagram of a media asset rating calculation process 200 according to one embodiment of the invention. The media asset rating calculation process 200 can, for example, be used with a media management application, such as the computer program 108 (MMA) illustrated in FIG. 1. The media asset rating calculation process 200 refers specifically to albums (e.g., music albums) and album tracks (e.g., songs on an album). However, the invention is not limited to such media types. For example, the rating calculation process could apply to playlists or other collections of media assets in place of albums and could apply to videos or music videos in place of album tracks (audio tracks).

The media asset rating calculation process 200 can be used to calculate ratings for unrated media assets if a user has entered a rating for any media asset collection to which the media assets belong. For example, if a user rates a music album, all unrated album tracks on that album can receive the same rating that the album received. Alternately, if a media asset collection is unrated, but individual media assets that belong to that media asset collection receive user ratings, then a media asset collection rating can be calculated for that media asset collection based on the average ratings of individual media assets in the media asset collection. For example, if a user rates album tracks on an album, the album will receive a rating based on the average of the ratings of all the user-rated album tracks. Thus, in this embodiment, the ratings of media assets without user-ratings are not considered in the calculation.

In one embodiment of the invention, user-ratings are given priority over ratings calculated using the media asset calculation process 200. According to this embodiment, user-ratings can be used to calculate ratings for unrated media assets, but calculated ratings are used to overwrite prior user-ratings. For example, if a music album has a user-rating (i.e., has been rated by a user), rating individual album tracks in the album will not affect the user album rating. Conversely, if any album tracks on an album have user-ratings, then rating the album will not affect any of the user album track ratings.

The media asset rating calculation process 200 begins with a decision 201 which detects when an album has received a user-rating. When decision 201 detects that an album has received a user-rating, that user-rating is assigned 211 to that album and the media asset rating calculation process 200 continues to decision 213. The decision 213 determines if any of the album tracks on the album lack user-ratings. Any album tracks without user ratings can then be assigned 215 the same user-rating that was assigned 211 to the album. If decision 213 determines that none of the album tracks are unrated, then the media asset rating calculation process 200 returns to decision 201 and subsequent blocks.

On the other hand, if decision 201 does not detect that an album has received a user-rating, then a decision 203 can check if an album track has received a user-rating. If so, then the user-rating can be assigned 205 to the album track and the media asset rating calculation process 200 continues to decision 207. Alternately, if the decision 203 determines that no album track has received a user rating, then media asset rating calculation process 200 returns to decision 201 and subsequent blocks.

Once the user album track rating has been assigned 205, the media asset rating calculation process 200 continues to decision 207, which determines if the album has previously been assigned a user-rating. If not, then the album can be assigned 209 a user album rating, which is calculated using any existing user track ratings. In one embodiment of the invention, the user album rating is calculated by taking the mean (i.e., average) of the ratings of all user-rated album tracks in the album. If, on the other hand, decision 207 determines that the album has previously been assigned a user album rating, then the media asset rating calculation process 200 continues to decision 201 and subsequent blocks.

In one embodiment of the invention, media assets are rated on a scale of 1 to 5, with 5 being the highest rating. In this rating system, a rating of zero indicates no rating. One example of a media asset rating system is found in the iTunes™ application, produced by Apple Inc. of Cupertino, Calif.

Figure 3:
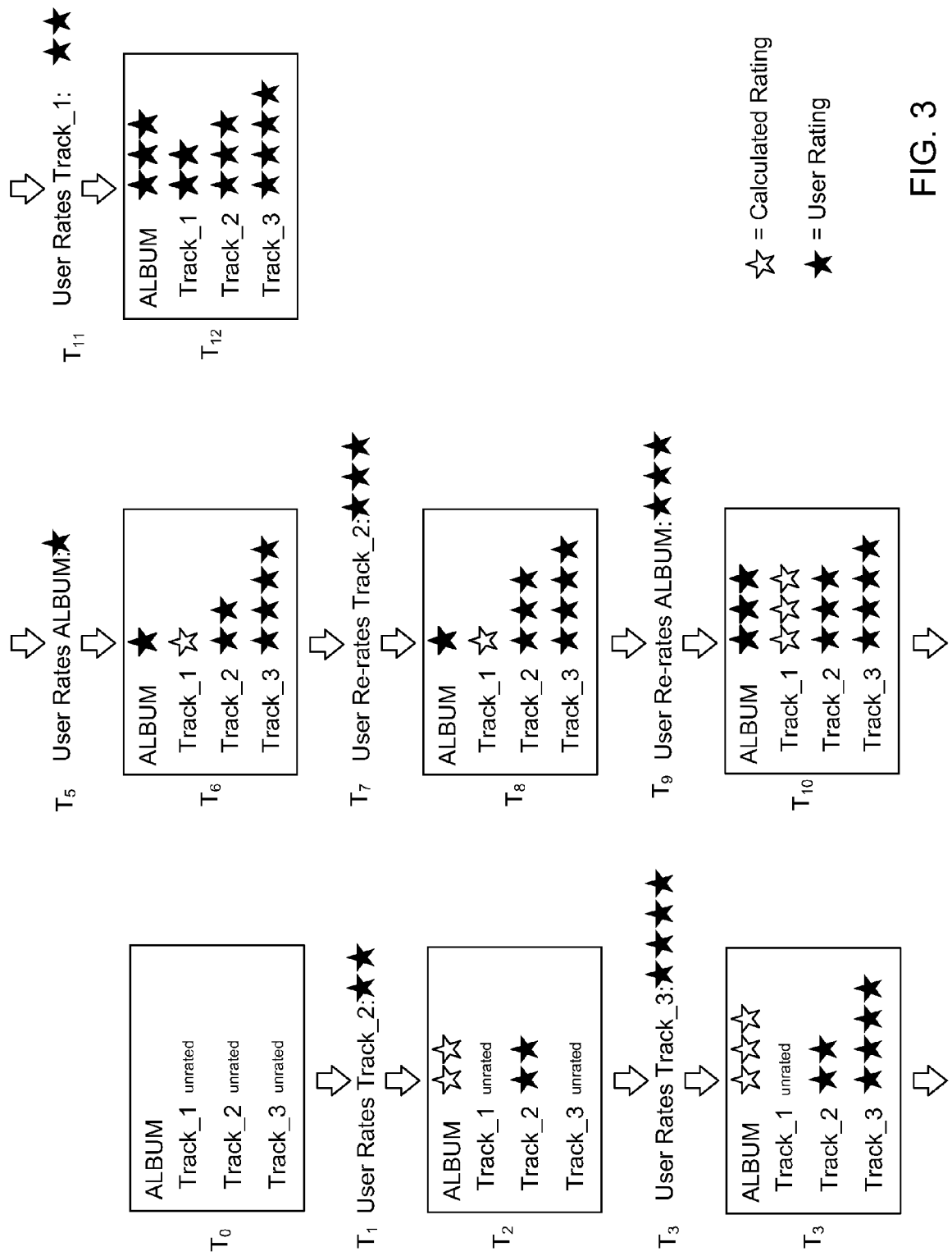
FIG. 3 is an example of a series of media asset rating calculations according to one embodiment of the invention.

FIG. 3 depicts an example of a series of media asset ratings calculated using a media asset rating calculation process, for example, the series of media asset ratings may be calculated using a media asset rating calculation process 200 described in FIG. 2. As discussed above in FIG. 2, in one embodiment, user-ratings can take priority over calculated ratings. Thus, in FIG. 3, user-ratings are not overwritten by calculated ratings. For example, if a user album rating has been assigned to a particular album, rating album tracks in that album will not affect the user album rating.

FIG. 3 shows a series of time snapshots for a hypothetical media asset collection called ALBUM. Each user rating state shows a snapshot of all user-ratings and calculated ratings for ALBUM and for the album tracks on ALBUM at time $T_n$, where n is an integer index, initially set to 0. ALBUM is shown having three album tracks, Track_1, Track_2, and Track_3, and starts out at time $T_0$ without any user-ratings or calculated ratings.

Interspaced with the album rating states are time snapshots of hypothetical user interactions with a user-rating system, in this case a system where a user rates media assets on a scale of one to four stars. Ratings are shown as a series of stars located next to either ALBUM or one of its tracks. Further, in example 200, solid black stars indicate user-ratings while white stars indicate calculated ratings.

As noted above, at time $T_0$, ALBUM has not yet been rated, thus no ratings are shown. At $T_1$ a user enters a rating of two stars for Track_2. Next, at time $T_2$, ALBUM receives a calculated rating of two stars, shown as white stars to indicate that the rating is calculated rather than entered by a user. In this case, the album rating is based solely on the two star user track rating of two stars given to Track_2. The ratings of Track_1 and Track_3 do not count when calculating the albums calculated rating since neither has received a user-rating yet.

At time $T_3$ a user enters a rating of four stars for Track_3. At time $T_4$ ALBUM receives a new calculated rating of three stars, based on the average of the ratings for Track_2 and Track_3.

At time $T_5$ a user enters a rating of one star for ALBUM. At this point the rating for ALBUM becomes a user-rating rather than a calculated rating and is will no longer be calculated when user album track ratings are changed. However, at time $T_6$, album track Track_1 receives a calculated rating of one star, equal to the user-rating given to ALBUM.

At time $T_7$, the rating for Track_2 is changed from two to three stars. However, as shown at time $T_8$, the re-rating of Track_2 does not affect the user album rating given to ALBUM, since ALBUM's album user-rating overrides the calculated rating of three stars that would display if ALBUM had not had an user album rating.

At time $T_9$, ALBUM receives a new rating of three stars. At time $T_{10}$, the rating of Track_1, which has not yet received a user track rating, is recalculated and adjusted to three stars to match the user album rating.

At time $T_{11}$, the user rates track Track_1, giving it two stars. At $T_{11}$ the album and all album tracks have received user ratings. As discussed above, in Example 2, user-ratings take priority over calculated ratings. Thus, beginning at time $T_{11}$, no new ratings will be calculated, although a user may re-rate the album or album tracks manually if desired.

Figure 4:
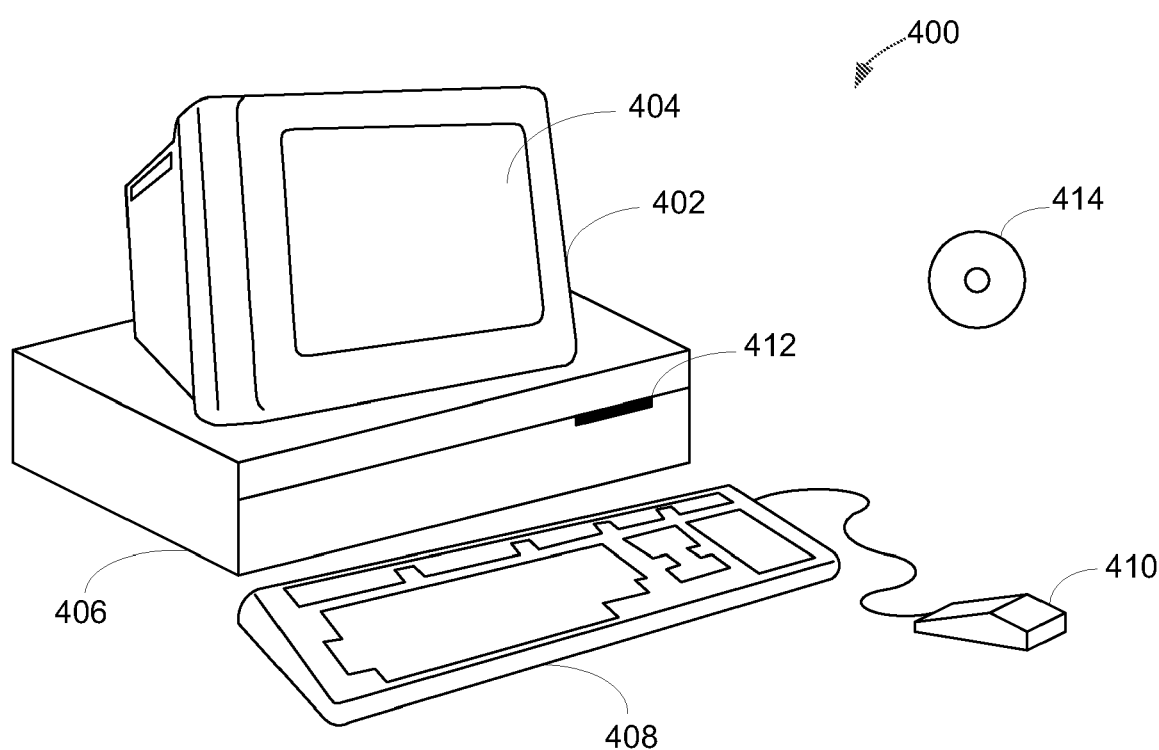
FIG. 4 shows an exemplary computer system suitable for use with the invention.

FIG. 4 shows an exemplary computer system 400 suitable for use with the invention. The methods, processes and/or graphical user interfaces discussed above can be provided by a computer system. The computer system 400 includes a display monitor 402 having a single or multi-screen display 404 (or multiple displays), a cabinet 406, a keyboard 408, and a mouse 410. The cabinet 406 houses a processing unit (or processor), system memory and a hard drive (not shown). The cabinet 406 also houses a drive 412, such as a DVD, CD-ROM or floppy drive. The drive 412 can also be a removable hard drive, a Flash or EEPROM device, etc. Regardless, the drive 412 may be utilized to store and retrieve software programs incorporating computer code that implements some or all aspects of the invention, data for use with the invention, and the like. Although CD-ROM 414 is shown as an exemplary computer readable storage medium, other computer readable storage media including floppy disk, tape, Flash or EEPROM memory, memory card, system memory, and hard drive may be utilized. In one implementation, a software program for the computer system 400 is provided in the system memory, the hard drive, the drive 412, the CD-ROM 414 or other computer readable storage medium and serves to incorporate the computer code that implements some or all aspects of the invention.

The various aspects, features, embodiments or implementations of the invention described above can be used alone or in various combinations.

The invention is preferably implemented by software, hardware, or a combination of hardware and software. The invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium include Flash memory, EEPROM memory, memory card, CD-ROM, DVD, hard drive, magnetic tape, optical data storage device, and carrier wave. The computer readable medium can also be distributed over network-coupled computer systems so that the computer readable code is stored and executed in a distributed fashion.

The invention is preferably implemented by software, hardware, or a combination of hardware and software. The invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method for assigning ratings to media assets, said method comprising:
    obtaining at least one user-rating of one or more user-rated media assets in the media asset collection;
    calculating a first rating for an unrated media asset collection based on the at least one user-rating of two or more user-rated media assets in the media asset collection, wherein the rating for the unrated media asset collection is calculated by taking an average user-rating of the two or more user-rated media assets in the unrated media asset collection;
    assigning the first rating to the unrated media asset collection;
    determining whether there is one or more unrated media assets in the media asset collection;
    assigning a second rating to the one or more unrated media assets in the media asset collection, wherein the second rating that is assigned to each of the one or more unrated media assets in the media asset collection is equal to the first rating of the unrated media asset collection;

determining whether the at least one user-rating of the one or more user-rated media assets in the media asset collection has changed;

recalculating the first rating for the previously unrated media asset collection based on the at least one user-rating of the one or more user-rated media assets in the media asset collection that has changed; and assigning the recalculated rating to the unrated media asset collection.

2. A media management system, comprising:

a media store server including a rating module that is configured to:

determine a calculated rating for a user-unrated media asset collection based on prior user ratings of two or more of the media assets in the media asset collection, wherein the calculated rating for the user-unrated media asset collection is calculated by taking an average user-rating of the two or more user-rated media assets in the user-unrated media asset collection;

determine whether there is one or more user-unrated media assets in the media asset collection;

determine a calculated rating for the one or more user-unrated media assets in the media asset collection based on the calculated rating of the user-unrated media asset collection, wherein the calculated rating for the one or more user-unrated media assets is equal to the calculated rating of the user-unrated media asset collection;

determine whether at least one of the prior user-ratings of the one or more user-rated media assets in the media asset collection has changed; and recalculate the rating for the previously user-unrated media asset collection based on at least the at least one of the prior user-ratings of the one or more user-rated media assets in the media asset collection that has changed.

3. The media management system as recited in claim 2, wherein said rating module is further configured to:

assign the determined calculated rating or the recalculated rating to the one or more user-unrated media assets in the media asset collection to the one or more user-unrated media assets in the media asset collection; and assign the determined calculated rating or the recalculated rating to the user-unrated media asset collection to the media asset collection.

4. A computer readable storage medium including at least executable computer program code stored thereon for assigning ratings to media assets, said computer readable medium comprising:

computer program code for receiving a user collection rating for a collection including a plurality of tracks;

computer program code for assigning the user collection rating to those of the tracks within the collection that have not been previously user-rated;

computer program code for receiving a user track rating associated with a particular one of the tracks;

computer program code for determining whether the particular one of the tracks has been previously user-rated or assigned the user collection rating;

computer program code for assigning the user track rating to the particular one of the tracks when determined to have been previously assigned the user collection rating;

computer program code for determining whether the collection has been previously user-rated;

computer program code for determining a computed track rating based on the tracks of the collection that have been previously rated by the user;

computer program code for assigning the computed track rating to the collection as a calculated collection rating if the collection is determined not to have been previously user-rated;

computer program code for determining whether the at least one user-rating of one or more of the tracks in the collection has changed;

computer program code for re-determining the computed track rating based on the tracks of the collection that have been previously rated by the user when determined that the at least one user-rating of one or more of the tracks in the collection has changed; and computer program code for assigning the re-determined computed track rating to the collection.

5. The computer-implemented method as recited in claim 4, wherein the computed track rating is an average track rating.

6. The computer-implemented method as recited in claim 1, further comprising:

receiving a user rating for the unrated media asset collection that was rated using the calculated first rating; and assigning the received user rating to the unrated media asset collection.

7. The computer-implemented method as recited in claim 6, further comprising:

determining whether there is one or more unrated media assets in the media asset collection;

recalculating a rating for the one or more unrated media assets based on the received user rating; and assigning the recalculated rating to the one or more unrated media assets in the media asset collection, wherein the recalculated rating that is assigned to each of the one or more unrated media assets in the media asset collection is equal to the received user rating.

8. The computer-implemented method as recited in claim 7, wherein the recalculated rating that is assigned to each of the one or more unrated media assets in the media asset collection is equal to the received user rating.

9. The media management system as recited in claim 3, wherein the media store server is further configured to:

receive a user rating for the user-unrated media asset collection that was rated using the calculated rating or the recalculated rating; and assign the received user rating to the user-unrated media asset collection that was rated using the calculated rating or the recalculated rating.

10. The media management system as recited in claim 9, wherein the media store server is further configured to:

determine whether there is one or more user-unrated media assets in the media asset collection;

calculate an asset rating for the one or more user-unrated media assets based on the received user rating; and assign the asset rating to the one or more user-unrated media assets in the media asset collection.

11. The computer-implemented method as recited in claim 1, wherein the media asset collection is an album and the media assets are songs.

12. The media management system as recited in claim 2, wherein the media asset collection is an album and the media assets are songs.

13. The computer readable storage medium as recited in claim 4, wherein the collection is an album and the tracks are songs.

* * * * *